US011084238B2

(12) United States Patent
Fabbretti et al.

(10) Patent No.: US 11,084,238 B2
(45) Date of Patent: Aug. 10, 2021

(54) METHOD FOR CONTROLLING THE THICKNESS OF A CONTINUOUS ELONGATED ELEMENT MADE OF ELASTOMERIC MATERIAL IN A PROCESS FOR BUILDING TYRES

(71) Applicant: PIRELLI TYRE S.P.A., Milan (IT)

(72) Inventors: Marco Fabbretti, Milan (IT); Andrea Crepaldi, Milan (IT); Cesare Emanuele Amurri, Milan (IT); Maurizio Marchini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 373 days.

(21) Appl. No.: 16/190,267

(22) Filed: Nov. 14, 2018

(65) Prior Publication Data

US 2019/0077104 A1 Mar. 14, 2019

Related U.S. Application Data

(62) Division of application No. 14/433,268, filed as application No. PCT/IB2013/058999 on Sep. 30, 2013, now Pat. No. 10,173,383.

(Continued)

(30) Foreign Application Priority Data

Oct. 9, 2012 (IT) .......................... MI2012A001695

(51) Int. Cl.
*B29D 30/16* (2006.01)
*B29D 30/30* (2006.01)
(Continued)

(52) U.S. Cl.
CPC ............. *B29D 30/16* (2013.01); *B29D 30/30* (2013.01); *B29C 43/48* (2013.01);
(Continued)

(58) Field of Classification Search
CPC .. B29D 30/16; B29D 30/162; B29D 30/1628; B29D 30/1635; B29D 30/1678;
(Continued)

(56) References Cited

U.S. PATENT DOCUMENTS

| 1,077,127 A | 10/1913 | Doughty |
| 3,768,807 A | 10/1973 | Spengler |

(Continued)

FOREIGN PATENT DOCUMENTS

| CN | 102015269 | 4/2011 |
| DE | 196 49 556 | 6/1998 |

(Continued)

OTHER PUBLICATIONS

Office Action and Search Report from the Brazilian Patent Office in counterpart Brazilian Application No. BR112015007389, dated Nov. 19, 2019.

(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A method for controlling the thickness of a continuous elongated element made of elastomeric material, applied according to coils wound on a forming support, includes: advancing a head end of the continuous elongated element toward the forming support; subjecting, during the advancement, the continuous elongated element to a first stretching with a first stretch coefficient before applying on the forming support; and subjecting, during the advancement, the continuous elongated element to a second stretching with a second stretch coefficient during the application on the forming support. During the first stretching, a span of the continuous elongated element adjacent to the head end is (Continued)

stretched with a supplementary stretch coefficient greater than the first stretch coefficient, in a manner so as to confer, also to the span adjacent to the head end, a stretch and a section similar or substantially equivalent to those of the rest of the continuous elongated element.

10 Claims, 4 Drawing Sheets

Related U.S. Application Data

(60) Provisional application No. 61/715,556, filed on Oct. 18, 2012.

(51) Int. Cl.

| | | |
|---|---|---|
| *B29D 30/60* | (2006.01) | |
| *B29C 48/00* | (2019.01) | |
| *B29C 48/355* | (2019.01) | |
| *B29C 48/07* | (2019.01) | |
| *B29C 48/92* | (2019.01) | |
| *B29C 43/48* | (2006.01) | |
| *B29L 30/00* | (2006.01) | |

(52) U.S. Cl.
CPC ........... *B29C 48/0011* (2019.02); *B29C 48/07* (2019.02); *B29C 48/355* (2019.02); *B29C 48/92* (2019.02); *B29C 2043/483* (2013.01); *B29C 2043/486* (2013.01); *B29D 30/60* (2013.01); *B29L 2030/00* (2013.01)

(58) Field of Classification Search
CPC B29D 30/30; B29D 30/3021; B29D 30/3028; B29D 30/3035; B29D 30/3078; B29D 30/60; B29C 48/0011; B29C 48/355; B29C 43/48; B29C 43/92; B29C 2948/92647; B29C 2043/483; B29C 2043/486
USPC .......................... 156/117, 397; 425/335, 371
See application file for complete search history.

(56) References Cited

U.S. PATENT DOCUMENTS

| | | |
|---|---|---|
| 3,852,387 A | 12/1974 | Bortnick et al. |
| 3,907,019 A | 9/1975 | Montagne |
| 3,955,481 A | 5/1976 | Heitmann |
| 4,149,926 A | 4/1979 | Taylor |
| 4,239,117 A | 12/1980 | Konars et al. |
| 4,240,863 A | 12/1980 | Vinton |
| 4,279,683 A | 7/1981 | Landsness |
| 4,290,248 A | 9/1981 | Kemerer et al. |
| 4,341,003 A | 7/1982 | Kopena |
| 4,696,779 A | 9/1987 | Wideman |
| 5,186,960 A | 2/1993 | Walsh |
| 5,505,599 A | 4/1996 | Kemerer et al. |
| 5,779,962 A | 7/1998 | Andraschko et al. |
| 5,915,611 A | 6/1999 | Baldoni et al. |
| 6,372,070 B1 | 4/2002 | Lizuka et al. |
| 6,554,041 B1 | 4/2003 | Ohki |
| 6,581,746 B1 | 6/2003 | Lundblad |
| 2003/0137095 A1 | 7/2003 | Ito et al. |
| 2006/0042190 A1 | 3/2006 | Garceau et al. |
| 2006/0081325 A1 | 4/2006 | Hayashi et al. |
| 2006/0090836 A1 | 5/2006 | Caretta et al. |
| 2007/0107848 A1 | 5/2007 | Hayashi et al. |
| 2009/0025857 A1 | 1/2009 | Marangoni et al. |
| 2010/0200151 A1 | 8/2010 | Marchini et al. |
| 2011/0036484 A1 | 2/2011 | Sangiovanni et al. |
| 2012/0067451 A1 | 3/2012 | Malenke et al. |

FOREIGN PATENT DOCUMENTS

| | | |
|---|---|---|
| DE | 10 2008 016 569 | 10/2009 |
| EP | 1 647 394 | 4/2006 |
| FR | 1426617 | 1/1966 |
| JP | 07-292129 | 11/1995 |
| JP | 2004-175567 | 6/2004 |
| JP | 2011-194737 | 10/2011 |
| WO | WO 2008/053278 | 5/2008 |
| WO | WO 2009/078247 | 6/2009 |
| WO | WO 2009/130727 | 10/2009 |
| WO | WO 2011/077236 | 6/2011 |

OTHER PUBLICATIONS

Machine generated English translation of WO 2009/078247 (original document dated Jun. 2009).
Machine generated English translation of JP 2011-194737 (original document dated Oct. 2011).
Machine generated English translation of JP 07-292129 (original document dated Oct. 2011).
International Search Report from the European Patent Office for International Application No. PCT/IB2013/058999, dated May 20, 2014.
Notification of the First Office Action from the State Intellectual Property Office of the People's Republic of China, in counterpart Chinese Application No. 201380052481.4 dated Jun. 23, 2016.
Office Action from the Mexican Patent Office in counterpart Mexican Application No. MX/a/2015/003999, dated Mar. 3, 2020.
Notification of the Second Office Action dated May 21, 2019, from China National Intellectual Property Administration, in counterpart Chinese Application No. 201710535136.6.

METHOD FOR CONTROLLING THE THICKNESS OF A CONTINUOUS ELONGATED ELEMENT MADE OF ELASTOMERIC MATERIAL IN A PROCESS FOR BUILDING TYRES

CROSS REFERENCE TO RELATED APPLICATIONS

This application is a Divisional Application of U.S. patent application Ser. No. 14/433,268, filed Apr. 2, 2015, which is a National Phase Application based on PCT/IB2013/058999, filed Sep. 30, 2013, which claims the priority of Italian Patent Application No. MI2012A001695, filed Oct. 9, 2012, and the benefit of U.S. Provisional Application No. 61/715,556, filed Oct. 18, 2012, the content of each application being incorporated herein by reference in its entirety.

BACKGROUND OF THE INVENTION

Field of the Invention

The present invention regards a method for controlling the thickness of a continuous elongated element made of elastomeric material in a process for building tyres for vehicle wheels.

Description of the Related Art

A tyre for vehicle wheels generally comprises a carcass structure comprising at least one carcass ply having respectively opposite terminal flaps engaged with respective annular anchoring structures, normally termed "bead cores", integrated in the areas normally identified with the name of "beads", having an internal diameter substantially corresponding with a so-called "fitting diameter" of the tyre on a respective mounting rim. In radially outer position, the carcass structure is associated with a belt structure comprising one or more belt layers, situated in radial superimposition with respect to each other and with respect to the carcass ply, having textile or metallic reinforcement cords with cross and/or substantially parallel orientation with respect to the circumferential extension direction of the tyre. In radially outer position, a tread band is applied to the belt structure, such tread band also made of elastomeric material like other semifinished products constituting the tyre. Between the tread band and the belt structure, a so-called "underlayer" can be interposed made of elastomeric material, with properties suitable for ensuring a stable joining of the tread band itself. On the lateral surfaces of the carcass structure, each being extended from one of the lateral edges of the tread band up to the respective annular anchoring structure to the beads, respective sidewalls made of elastomeric material are also applied.

It is observed that by "component made of elastomeric material" of the tyre, it is intended any part made of elastomeric material of the tyre (e.g. tread band, sidewalls, liner, under-liner, fillers in the bead area, sidewalls inserts in the self-supporting tyres, anti-abrasive inserts etc.), or a portion of such part, or the set formed by two or more of the aforesaid parts or portions thereof.

It must be specified that, with the term "elastomeric material" it is intended to indicate a composition comprising at least one elastomeric polymer and at least one reinforcement filler. Preferably, such composition also comprises additives such as, for example, a crosslinking agent and/or a plasticization agent. Due to the presence of the crosslinking agent, through heating such material can be crosslinked, so as to form the final manufactured product.

WO 2011/077236, on behalf of the same Applicant, describes a process and a plant with high flexibility for producing different types of green tyres in which at least two Work stations are provided that are adapted for producing structural components of the tyre and are equipped with a plurality of units for feeding elementary semifinished products. The elementary semifinished products can be selected from among a plurality of possible different semifinished products in order to obtain a great variety of tyres with high technological flexibility of the plant.

WO 2008/053278, on behalf of the same Applicant, describes an apparatus for building tyres provided with an assembly device comprising a unit for feeding a continuous elongated element made of elastomeric material, such unit equipped with an extruder and with a shaping device comprising a calender with two counter-rotating rollers, a conveyor having a surface movable along a predefined direction and towards a proximal end thereof adjacent to a forming support, an application device positioned at the proximal end. The continuous elongated element is advanced on the movable surface up to the proximal end and the forming support is made to rotate, in order to allow the application of the continuous elongated element according to coils wound on the abovementioned forming support.

WO 2009/130727, on behalf of the same Applicant, describes a process and an apparatus for building tyres in which a continuous elongated element made of elastomeric material is produced through an extruder and advanced on the movable surface of a conveyor along a predefined direction and with a linear advancement speed different from the linear exit speed from the extruder. Subsequently the continuous elongated element is applied on a forming support, which rotates with respect to the end of the conveyor with a peripheral speed different from the linear exit speed, in a manner so as deform the continuous elongated element and apply it according to coils wound on the abovementioned forming support.

SUMMARY OF THE INVENTION

In such technical field, the Applicant has observed the need to improve the quality of the tyres produced by optimising the application of the continuous elongated elements on the forming supports in order to obtain structural components which ensure the radial symmetry of the tyres themselves according to the design specifications.

The Applicant has observed that in devices such as those described in WO 2008/053278 or in WTO 2009/130727, the elements interposed between the extruder and the forming support are not suitable for treating and transporting all types of elastomeric material.

For example, the Applicant has verified that an assembly device like that described in WO 2008/053278 does not allow correctly managing elastomeric materials that are particularly adhesive, since the continuous elongated element formed by them tends to remain stuck to the lower roller of the calender, until it is wound thereon and causes the blocking thereof.

The Applicant has also observed that processes such as those described in WO 2008/053278 and WO 2009/130727 determine spans, between the extruder and the forming support, in which the continuous elongated element is suspended or simply abutted, so that it is subjected to deformations, due to the weight thereof or to the traction/compression to which it is subjected, which very much depend on its physical characteristics, especially in the case where the delivery is not a continuous process but provides for cycles of finite duration, with stop times between one cycle and the next.

More particularly, the Applicant has perceived the need to ensure that the continuous elongated elements, once deposited in coils, have a correct and constant section substantially along the entire longitudinal extension thereof.

The Applicant has indeed observed that in devices such as those described in WO 2008/053278 and in WO 2009/130727, the continuous elongated element undergoes a deformation between the extruder and the conveyor and a subsequent deformation between the conveyor and the forming support. In such continuous elongated element, the length of the head end corresponds with the distance between the output opening and said conveyor.

The Applicant observes that the aforesaid head end is not stretched because, once it has exited from the extruder, it is free until it reaches the conveyor. However, given that it has negligible size, the head end does not affect the quality and performances of the finished tyre.

In the same continuous elongated element, the length of the span arranged immediately adjacent to the head end is normally greater than the length of the aforesaid head end, as is better specified in the following of the present description.

The Applicant has observed that such double deformation does not allow conferring, to the span adjacent to the head end of said continuous elongated element, a section similar to or substantially equivalent to that of the rest of the continuous elongated element, generating a defect on the tyre that can compromise the quality and performance thereof.

However, since the stretching occurs in two steps and in two different areas of the apparatus, the span of continuous elongated element arranged immediately adjacent to the head end is only stretched in the first step since, once it has exited from the conveyor, it is free until it arrives below the application device. It follows that the continuous elongated element, once deposited on the forming support, has a constant stretching (and hence uniform reduction of its section) along its entire extension, except for along the aforesaid span adjacent to the head end and at the head end itself.

The Applicant has perceived that by varying a first stretch coefficient (which is obtained between the extruder and the conveyor) over time, it is possible to overcome the problems described above relative to the span adjacent to the head end.

The Applicant has finally found that such first stretch coefficient must be varied, with respect to an operating coefficient, during an initial transient of the deposition.

More particularly, according to a first aspect, the present invention regards a method for controlling the thickness of a continuous elongated element made of elastomeric material applied according to coils wound on a forming support.

Preferably, the method comprises: advancing a head end of said continuous elongated element towards the forming support.

Preferably, the method comprises: subjecting—during the advancement the continuous elongated element to a first stretching with a first stretch coefficient before applying on the forming support.

Preferably, the method comprises: subjecting—during the advancement the continuous elongated element to a second stretching w7ith a second stretch coefficient during the application on the forming support.

Preferably, during the first stretching, a span of the continuous elongated element adjacent to the head end is stretched with a supplementary stretch coefficient greater than the first stretch coefficient.

In accordance with a second aspect, the present invention regards a process for building tyres for vehicle wheels, comprising: forming components made of elastomeric material on a forming support.

Preferably, at least one of said components made of elastomeric material is obtained by: producing—through an extruder—a continuous elongated element made of elastomeric material.

Preferably the process comprises: arranging an output opening of the extruder between mutually converging input portions of two opposite conveyor belts.

Preferably the process comprises: introducing the continuous elongated element between said conveyor belts so that it is in contact therewith.

Preferably the process comprises: advancing said continuous elongated element by means of the conveyor belts up to the forming support.

Preferably the process comprises: applying the continuous elongated element according to coils wound on the forming support, to form the component made of elastomeric material.

According to a different aspect, the present invention regards an apparatus for building tyres for vehicle wheels, comprising:

at least one forming support;

at least one extruder for dispensing a continuous elongated element made of elastomeric material;

at least one conveyor arranged between the extruder and the forming support.

Preferably, the conveyor comprises two opposite conveyor belts having respective conveyor branches arranged face to face and adapted to advance—in contact therewith—the continuous elongated element from the extruder towards the forming support.

Preferably, the apparatus comprises at least one member for laying said continuous elongated element on said forming support operating in thrust relation towards the forming support.

Preferably, the apparatus comprises devices for rotating said forming support on its axis.

Preferably, an output opening of the extruder opens between mutually converging input portions of the conveyor belts.

The Applicant deems that the method, process and apparatus according to the invention allow conferring, to the span adjacent to the head end, a stretching and a section similar to or substantially equivalent to those of the rest of the continuous elongated element.

More particularly, the Applicant deems that the invention allows producing and depositing, with a same type of device, continuous elongated elements obtained with different elastomeric materials (e.g. very adhesive or very viscous) and/or intended to form different components of the tyre without having to substantially modify the device/devices itself/themselves.

In particular, the Applicant deems that the illustrated solution is able to manage, without structural changes of the apparatus and/or substantial modifications of the process, elastomeric materials that are very adhesive when hot, like those for the tread band, as well as very viscous elastomeric materials like those for the underlayer. The Applicant deems that this is due to the fact that calender rollers are not present, to which very adhesive elastomeric materials tend to remain stuck; nozzles are also not present, inside of which very viscous elastomeric materials reach overly high temperatures and locally vulcanize.

The Applicant also deems that in such a manner it is possible to obtain a facilitated and strong automatic drawling in of the continuous elongated element between the conveyor belts and the considerable reduction of the formation of folds on the initial elongated element due to the fact that the output opening is positioned very close to the conveyor belts without any further device interposed. The head of said continuous elongated element just exited from the extruder therefore comes to be situated already guided between the two conveyor belts; it releases the elastic tensions caused by the passage into the output opening and assumes a flat shape. The flat shape of the head at the output of the two conveyor belts ensures that this is correctly inserted between the laying member and the forming support without irregular rolling up, which normally causes production waste.

The Applicant finally deems that the illustrated solution allows stretching the continuous elongated element without risking to tear it and/or obtaining greater stretching, since it is possible to execute said stretching in two steps, one between the opening and the two conveyor belts and one between the conveyor belts and the forming support, with the advantage of subdividing the total stretching and preventing concentrations of stresses that would lead to breakage. The present invention, in at least one of the aforesaid aspects, can have one or more of the preferred characteristics which are described hereinbelow. Preferably, the supplementary stretch coefficient is equal to the product of the first stretch coefficient and the second stretch coefficient. In this manner, also the span adjacent to the head end of the continuous elongated element, which is not subjected to the second stretching, is elongated and has its section reduced like the rest of the continuous elongated element which is instead subjected to both the first and the second stretching.

In a modified embodiment, the supplementary stretch coefficient is less than the product of the first stretch coefficient and the second stretch coefficient. In this manner, said span adjacent to the head end, which is not subjected to the second stretching, is elongated and has its section reduced less than the rest of the continuous elongated element but more than the head end.

Preferably, the first stretch coefficient is comprised between about 1 and about 1.5.

Preferably, the second stretch coefficient is comprised between about 1 and about 3.

Preferably, the supplementary stretch coefficient is comprised between about 1 and about 2.

In a preferred embodiment, the output opening is arranged at a first distance less than about 10 mm from a first contact area between the two opposite conveyor belts and the continuous elongated element.

Preferably, said first distance is comprised between about 1 mm and about 5 mm.

The smaller such first distance, the greater are the above-listed advantages. If the continuous elongated element is stretched, such distance also corresponds to the length of the enlargement of the head end with respect to the rest of the continuous elongated element once deposited on the forming support.

In a further preferred embodiment, an end of the conveyor belts is arranged at a second distance less than about 100 mm from a first contact area between the continuous elongated element and the forming support. Preferably, said second distance is comprised between about 10 mm and about 50 mm.

If the continuous elongated element is subjected to double stretching, such second distance corresponds, as is better illustrated hereinbelow, to the sum of the length of the head end (i.e. of the first distance) and the length of the span arranged immediately adjacent to the head end which is preferably stretched with the supplementary stretch coefficient in order to make it uniform with the rest of the continuous elongated element.

Preferably, a linear speed of the two conveyor belts is greater than an exit speed of the continuous elongated element from the output opening.

In this manner, the continuous elongated element is conferred a first stretching with a first stretch coefficient that is given by the ratio between the linear speed and the exit speed.

Preferably, the ratio between the linear speed and the exit speed is comprised between about 1 and about 1.5.

Preferably, a peripheral speed of the forming support is greater than a linear speed of the two conveyor belts.

In this manner, the continuous elongated element is conferred a second stretching with a second stretch coefficient that is given by the ratio between the aforesaid peripheral speed and linear speed.

Preferably, the ratio between the peripheral speed and the linear speed is comprised between about 1 and about 3.

In accordance with a preferred embodiment, the linear speed during an initial transient is greater than the operating linear speed. The duration of the transient (measured, as illustrated hereinbelow, starting from when the head end is engaged between the conveyor belts) is given by the ratio between the difference between the abovementioned second distance and the first distance divided by the linear speed during the transient itself. In this manner, the span arranged immediately adjacent to the head end of the continuous elongated element is conferred a supplementary stretching.

Preferably, the ratio between the linear speed in the initial transient and the operating linear speed is comprised between about 1 and about 2.

According to a preferred embodiment, the linear speed during the initial transient is equal to the peripheral speed. In this manner, the stretching conferred in the transient to said span arranged immediately adjacent to the head end is equal to the sum of the first stretching and the second stretching conferred to the rest of the continuous elongated element. It follows that, apart from the head end, the entire continuous elongated element has the same stretch and same section (intended as area of the cross section), once applied to the forming support.

According to a different preferred embodiment, the linear speed during the initial transient is less than the peripheral speed (but still greater than the operating linear speed). In this manner, the stretching conferred in the transient to said span arranged immediately adjacent to the head end is less than the sum of the first stretching and the second stretching conferred to the rest of the continuous elongated element (but still greater than the single first stretching). It follows that the span arranged immediately adjacent to the head end has a stretch and a section similar but not equal to the rest of the continuous elongated element, once applied to the forming support.

In a further embodiment, it is provided to generate a signal function of the entry of the continuous elongated element between the two conveyor belts and use said signal for starting the rotation of the forming support. This solution allows optimizing the departure of the continuous elongated element and the initial step of its application on the forming support. The signal indicates that the head of the continuous elongated element in that instant is situated in a precise position and at a defined distance from the forming support and that therefore, as a function of the speed of the conveyor belts, it will be in contact with the forming support in a defined time. Such solution is also strong, precise and safe, since the signal is not affected by characteristics of the extruded elastomeric material.

Preferably, the signal is function of a movement of one of the conveyor belts along a direction transverse to an advancement direction of the continuous elongated element due to the introduction of the continuous elongated element between said conveyor belts. Such movement can be easily identifiable, for example with a proximity sensor that generates the abovementioned signal.

More preferably, the signal is function of a vertical movement of an upper belt of said two conveyor belts due to the introduction of the continuous elongated element between said conveyor belts.

Preferably it is provided to adjust the compression force of the two conveyor belts on the continuous elongated element.

Preferably, the process comprises: adjusting a vertical force exerted by an upper belt of said two conveyor belts on the continuous elongated element and on a lower belt of said two conveyor belts.

Such solution allows maintaining the pressure that is sufficient and necessary for ensuring that the continuous elongated element is driven by the conveyor belts without sliding.

Preferably it is provided to stop the extruder and move the two conveyor belts for purging the continuous elongated element.

Advantageously, through such operation, it is possible to easily purge the continuous elongated element from the opening. In detail, the belts detach the continuous elongated element from the output opening and unload it on the ground or in a suitable container.

Preferably, the opening from which the continuous elongated element exits is mounted directly on the output of the gear pump of the extruder.

In addition, preferably, the conveyor belts are coated with an anti-adherent material, so that even the most adhesive elastomeric material is treatable.

Preferably, the external profile of the output opening is such to followl the shape of the mutually converging portions of the conveyor belts. This allows positioning the output opening very close to the mutually converging portions of the conveyor belts.

Preferably, the conveyor comprises two opposite pulleys, the respective conveyor belt being partly wound on each of said pulleys; wherein the output opening is positioned at an area of maximum proximity between said pulleys.

The pulleys allow simply delimiting the mutually converging portions of the conveyor belts and the placement space of the opening.

Preferably, a single first belt (e.g. the lower belt) is motorized while the other belt is conducted by friction by the first.

Preferably, the output opening is arranged at a first distance less than about 10 mm from the area of maximum proximity.

Preferably, said first distance is comprised between about 1 mm and about 5 mm.

Preferably, an end of the conveyor is arranged at a second distance less than about 100 mm from the forming drum.

Preferably, said second distance is comprised between about 10 mm and about 50 mm.

In accordance with one embodiment, the apparatus comprises at least one control unit operatively connected to the extruder, to the conveyor and to the forming support for adjusting the ratios between an exit speed of the continuous elongated element from the opening, a linear speed of the two conveyor belts and a peripheral speed of the forming support.

Preferably, the conveyor comprises a movement sensor operatively connected to the control unit and adapted to detect the movement of one of the conveyor belts with respect to the other along a direction transverse to an advancement direction of the conveyor branches.

Such solution is relatively inexpensive and safe, and can be implemented for example with a simple proximity switch.

Preferably the movement sensor detects a vertical movement of an upper conveyor belt of said two conveyor belts.

Preferably, the conveyor comprises at least one actuator, connected to at least one of the conveyor belts and adapted to vary the mutual compression force between the two conveyor branches.

More preferably said actuator is a pneumatic spring.

Preferably the actuator is connected to the upper conveyor belt of said tw7o conveyor belts.

Further characteristics and advantages will be clearer from the description of a preferred but not exclusive embodiment of a process and of an apparatus for building tyres and of a method for controlling the thickness of a continuous elongated element made of elastomeric material, in accordance with the present invention.

BRIEF DESCRIPTION OF THE DRAWINGS

Such description will be set forth hereinbelow with reference to the set of drawings, provided merely as a non-limiting example, in which.

DETAILED DESCRIPTION OF THE INVENTION

With reference to the abovementioned figures, with 1 a plant is indicated in its entirety for the building of tyres 2 in accordance with the present invention.

Figure 4:
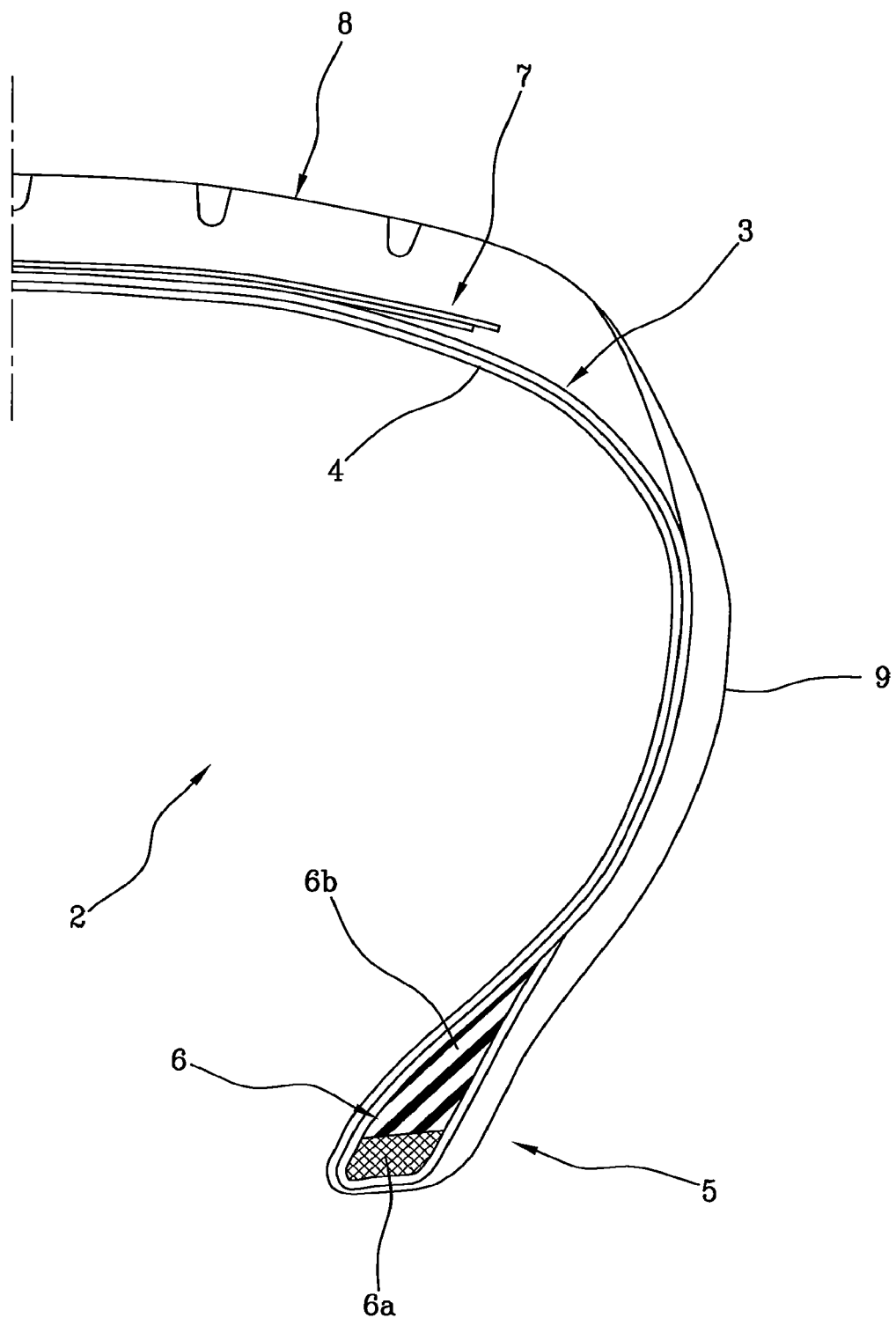
FIG. 4 schematically shows, in diameter section, a tyre for vehicle wheels obtained with the plant of FIG. 1.

The plant 1 is set to obtain tyres 2 (FIG. 4) essentially comprising at least one carcass ply 3 preferably internally coated with a layer of impermeable elastomeric material or so-called liner 4, two so-called "beads" 5 integrating respective annular anchoring structures 6 comprising respective bead cores 6a possibly associated with elastomeric fillers 6b and engaged with the circumferential edges of the carcass ply 3, a belt structure 7 applied in radially outer position to the carcass ply 3, a tread band 8 applied in radially outer position to the belt structure 7, in a so-called crown area of the tyre 2, and two sidewalls 9 applied in laterally opposite positions on the carcass ply 3, each at a lateral area of the tyre 2, being extended from the corresponding bead 5 to the corresponding lateral edge of the tread band 8.

The plant 1 comprises a plurality of work stations, each for example arranged to form a component of the tyre 2 being processed directly on a forming support 11, 16 preferably with cylindrical or toroidal conformation. As an alternative, it can be provided that one or more components of the tyre 2 being processed, rather than be directly obtained on the forming support, are obtained as semifinished products from preceding processing steps and assembled with other components on said forming support.

By way of example, the plant 1 preferably comprises a line 10 for building carcass structures, in which a carcass structure, comprising at least one of the carcass plies 3 and the annular anchoring structures 6, is formed on a forming support defined by a building drum 11. The line 10 for building carcass structures comprises a device 12 for building carcass sleeves on the building drums 11. The building device 12 comprises a plurality of work stations 13. For example, a first work station 13 achieves the liner 4, in at least one second work station 13 of the building device 12 the obtainment of one or more carcass plies 3 can be actuated. The line 10 for building carcass structures also comprises a further work station 14 dedicated to the integration of the annular anchoring structures 6 in said at least one carcass ply 3, through application of the same annular anchoring structures 6 in axially outer position to the flaps of said at least one carcass ply 3 turned down in the direction of the rotation axis of said building drum 11, flaps which are subsequently turned up around the annular anchoring structures 6. Downstream of the work station 14 for the integration of the annular anchoring structures 6, further work stations 13 can be present, for example for obtaining at least one portion of an anti-abrasive element or of the sidewalls 9.

Figure 1:
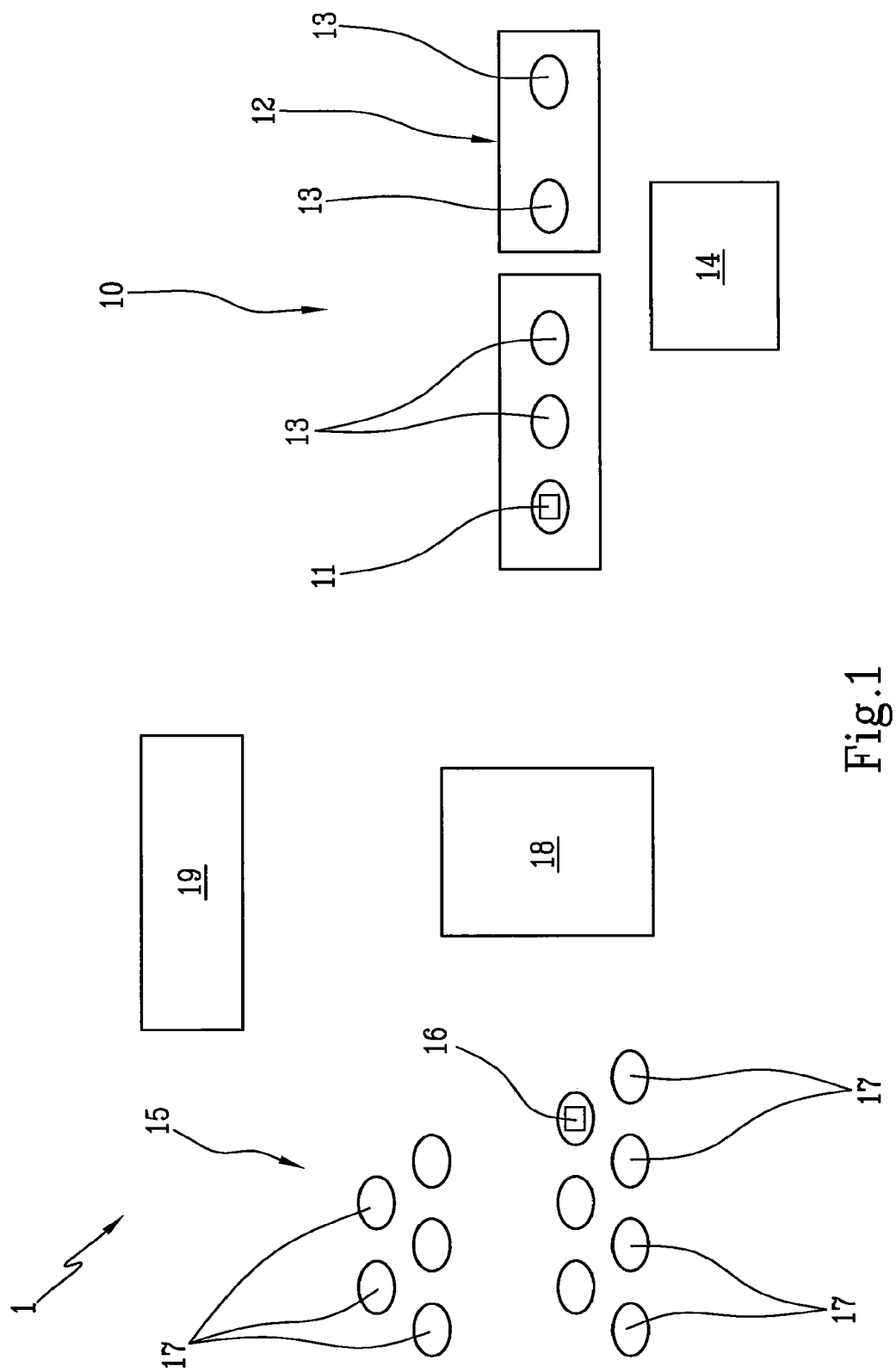
FIG. 1 schematically shows, in top view, a plant for the building of tyres in accordance with the present invention.

The plant 1 also comprises a line 15 for building crown structures, in which a crown structure, comprising at least the belt structure 7 and preferably also the tread band 8, is formed on a forming support defined by a forming drum 16. In FIG. 1 a plurality of work stations 17 are indicated that belong to the aforesaid line 15 for building crown structures, each dedicated to forming at least one portion of a component of the crown structure itself of the tyre 2 on the forming drum 16. The forming drum 16 is sequentially transferred from one work station to the next work station by means of suitable devices, not illustrated. At least one work station 17 can be dedicated to the obtainment of the belt structure 7. By way of example, a work station 17 is preferably arranged for obtaining the tread band 8 and/or the sidewalls 9. The plant 1 is also provided with an assembly and shaping station 18 operatively associated with the line 10 for building the carcass structures and with the line 15 for building crown structures. In the assembly and shaping station 18, the carcass structure is toroidally shaped and associated with the crown structure, in a manner so as to obtain a green tyre. The green tyres built by the plant 1 are sequentially transferred to a vulcanization line 19, from which the moulded and vulcanized tyres 2 are obtained.

In accordance with the present invention, at least one of the components made of elastomeric material of the tyre 2, such as the liner 4, fillers 6b and/or other parts made of elastomeric material of sidewalls 9, tread band 8, under-belt layer, underlayer of the tread band, anti-abrasives and/or other, is obtained by an apparatus indicated in its entirety with 20 (FIG. 2), through winding of a continuous elongated element 21 made of elastomeric material preferably according to coils mutually adjacent or partially superimposed and distributed along a forming surface 11a, 16a of the forming support 11, 16 preferably with cylindrical or toroidal conformation.

The apparatus 20 comprises an extruder 22 equipped with a cylinder 23 in which elastomeric material is introduced. The cylinder 23, heated to a controlled temperature, approximately comprised between about 40° C. and about 120° C., operatively houses a rotary screw 24; upon actuating such screw, elastomeric material is thrust along the cylinder 23 itself, towards an exit opening 25 of the extruder 22. The elastomeric material is conveyed through a gear pump 26, operatively interposed between the rotary screw 24 and the exit opening 25, in order to ensure greater flow rate uniformity through the latter. More in detail, a flange 22a is mounted on the extruder 22 and carries an output opening 22b delimiting exit duct 22c terminating with said exit opening 25. The exit opening 25 is close to the gear pump 26. In particular, the distance between the abovementioned gear pump 26 and the exit opening 25, i.e. the length of the delimited duct 22c of the output opening 22b, is less than about 100 mm, preferably comprised between about 60 mm and about 80 mm, in a manner so as to limit the sliding of the elastomeric material on the walls of the duct 22c and therewith the generation of damaging local cross-linking of the elastomeric material itself. Preferably, also the flange 22a and the output opening 22b are thermoregulated, i.e. heated to a controlled temperature. Also the screw 24 and the gear pump 26 can be heated to a controlled temperature, approximately comprised between about 40° C. and about 120° C. The output opening 22b has a tapered profile with external walls that converge towards the exit opening 25. Through the exit opening 25, the continuous elongated element 21 made of green elastomeric material is consequently delivered, such element having a profile of substantially circular or ellipsoidal cross section. In both of the aforesaid cases, the area of the cross section of the exit opening 25 is preferably comprised between about 10 mm$^2$ and about 40 mm$^2$.

The apparatus 20 comprises a conveyor 27, interposed between the extruder 22 and the forming support 11, 16 and adapted to carry the continuous elongated element 21 up to the forming support 11, 16, a laying member 28 for pressing the continuous elongated element 21 against said forming support 11, 16 while the latter revolves, moved by devices 29 in order to make it rotate on its axis "X-X".

Figure 2:
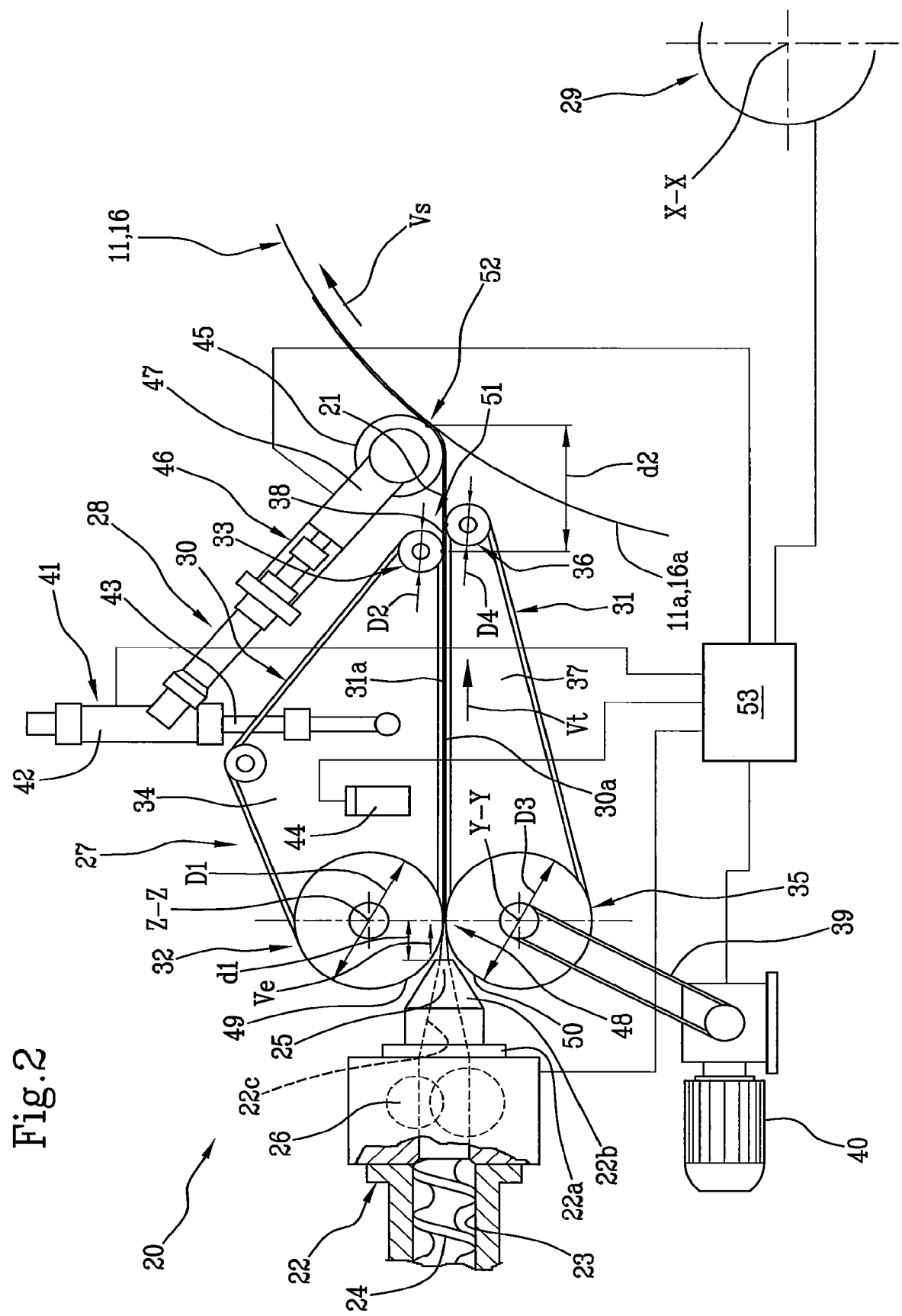
FIG. 2 shows in detail an apparatus of the plant of FIG. 1.

The conveyor 27 comprises two conveyor belts: a first conveyor belt 30 (upper belt in the FIG. 2) and a second conveyor belt 31 (lower belt in the FIG. 2).

The first conveyor belt 30 is wound on a first pulley 32 arranged at the extruder 22 and on a first roller 33 arranged at the laying member 28. The first roller 33 is smaller than the first pulley 32 and, preferably, the diameter "D1" of the first pulley 32 is about four times the diameter "D2" of the first roller 33. In the embodiment illustrated in FIG. 2, the roller 33 can for example have a diameter "D2" comprised between about 25 mm and about 30 mm, while the pulley 32 can have a diameter "D1" of about 100 mm. The first pulley 32 and the first roller 33 are rotatably mounted on a first support frame 34. The first conveyor belt 30 is extended along a preferably triangular path (and has a first rectilinear conveyor branch 30a adapted to come into contact with the continuous elongated element 21 to be conveyed. In the illustrated embodiment, such first conveyor branch 30a has its face intended to come into contact with the continuous elongated element 21 turned downward.

The second conveyor belt 31 is wound on a second pulley 35 arranged at the extruder 22 and on a second roller 36 arranged at the laying member 28. Analogous to that described for the first conveyor belt 30, the second roller 36 is smaller than the second pulley 35 and, preferably, the diameter "D3" of the second pulley 35 is about four times the diameter "D4" of the second roller 36. The diameter "D3" of the second pulley 35 is preferably equal to that of the first pulley 32. The diameter "D4" of the second roller 36 is therefore preferably equal to that of the first roller 33. The second pulley 35 and the second roller 36 are rotatably mounted on a second support frame 37. Also the second conveyor belt 31 is extended along a substantially triangular path and has a rectilinear second conveyor branch 31a adapted to come into contact with the continuous elongated element 21 to be conveyed. In the illustrated embodiment, such second conveyor branch 31a has its face intended to come into contact with the continuous elongated element 21 turned upward.

The first and the second conveyor branch 30a, 31a are arranged face to face. When the continuous elongated element 21 is not present between them, said two conveyor branches 30a, 31a are in mutual contact. For such purpose, the first support frame 34 and the second support frame 37 are installed on a support structure, not illustrated.

The first and the second pulley 32, 35 lie in mutual contact (only separated by the conveyor belts 30, 31 which partly wrap around them) and the second conveyor branch 31a is longer than the first conveyor branch 30a, i.e. the second roller 36 is moved more towards the laying member 28 with respect to the first roller 33. Therefore, a terminal span 38 of the second conveyor branch 31a close to the second roller 36 remains free, i.e. not facing the first conveyor branch 30a. The aforesaid embodiment allows leaving more manoeuvring space for the movement of the laying member 28.

The second pulley 35 is operatively connected, for example by means of a belt 39, to a motor 40 which moves it in rotation around its rotation axis "Y-Y". The second (motorized) pulley 35 transmits motion to the second conveyor belt 31 (e.g. through a toothing) and to the second roller 36. Due to the friction between the conveyor branches 30a, 31a in direct contact or between the conveyor branches and the continuous elongated element 21 interposed between them, the second pulley 35 drives the first conveyor belt 30 and rotates the first pulley 32 around its rotation axis "Z-Z" and the first roller 33. This allows driving the continuous elongated element 21 between the aforesaid opposite conveyor belts without relative movements or sliding respect thereto. In practice, the speed of the conveyor belts coincides w7ith the advancement speed of the continuous elongated element 21.

The first support frame 34 can be vertically moved, with a limited travel, with respect to the support structure on which it is mounted by means of suitable guides, not illustrated.

An actuator 41, e.g. a hydraulic or pneumatic piston, is mounted on the support structure and is connected to the first support frame 34. In the illustrated embodiment, the actuator 41 has a body 42 constrained to the support structure and a stem 43 constrained to the first support frame 34 and preferably perpendicular to the conveyor branches 30a, 31a. A movement sensor 44 positioned at the first conveyor belt 30 is capable of detecting each vertical movement of the first conveyor branch 30a.

The laying member 28 comprises a roller 45 operating in thrust relation towards the forming support 11, 16 due to the action, for example, of a second actuator 46. In the illustrated exemplifying embodiment, the roller 45 is idly mounted on an end of a stem 47 of the second actuator 46, obtained for example by a pneumatic piston. A lateral cylindrical surface of the idle roller 45 abuts and pushes against the continuous elongated element 21 applied to the forming support 11, 16.

The first pulley 32 and the second pulley 35 identify a mutual area of maximum proximity 48 situated on the line that joins the axes of rotation "Z-Z", "y-Y" of said two pulleys 32, 35. Such area of maximum proximity 48 is the first contact area between the two opposite conveyor belts 30, 31 and the continuous elongated element 21 which exits from the extruder 22.

The first pulley 32 identifies a first input portion 49 of the respective first conveyor belt 30 which is arranged in contact with the respective first pulley 32; such pulley describes an arc of a circle and is facing from the top to the output opening 22b of the extruder 22. Analogously, the second pulley 35 identifies a second input portion 50 of the respective second conveyor belt 31 which is arranged in contact with the respective second pulley 35; such pulley describes an arc of a circle and is facing from the bottom to the output opening 22b of the extruder 22. The first input portion 49 and the second input portion 50 converge towards each other and towards the area of maximum proximity 48, delimiting between them a wedge-shaped space or housing.

The output opening 22b of the extruder 22 is positioned in said wedge-shaped housing and the exit opening 25 is turned towards the area of maximum proximity 48 and situated at a first distance "d1" less than about 10 mm and preferably comprised between about 1 mm and about 5 mm from said area of maximum proximity 48. An end 51 of the conveyor 27 opposite the area of maximum proximity 48, which in the illustrated embodiment is the terminal end of the first conveyor branch 30a arranged at the first roller 33, is situated at a second distance "d2" from the laying member 28, more particularly, from the point of contact between the idle roller 45 and the forming support 11, 16 (in the absence of the continuous elongated element 21) or between the idle roller 45 and a first contact area 52 of the continuous elongated element 21 with the forming support 11, 16.

More generally, the second distance "d2" is defined as the distance comprised between the point proximal to the forming support 11, 16 at which the first conveyor branch 30a and the second conveyor branch 31a are not facing each other and the point of contact between the idle roller 45 and the forming support 11, 16 (or between the idle roller 45 and a first contact area 52 of the continuous elongated element 21 with the forming support 11, 16).

In particular, when for structural reasons, the conveyor branches 30a and 31a do not coincide for their entire length (as in FIG. 2), the distance "d2" is substantially calculated starting from the projection of the centre of the roller furthest from the forming support on the corresponding conveyor branch; when the branches 30a and 31a coincide, such distance is calculated starting from the projection of the centre of any one of the two rollers on the corresponding conveyor branch.

Such second distance "d2" is less than about 100 mm and preferably comprised between about 10 mm and about 50 mm. The first distance "d1" and the second distance "d2" are measured parallel to the conveyor branches 30a, 31a. The apparatus 20 also comprises at least one control unit 53 operatively connected to the motor 40, to the devices 29 for moving the forming support 11, 16, to the extruder 22, to the actuator 41, to the laying member 28 and to the movement sensor 44.

During use and in accordance with the method and the process of the present invention, the continuous elongated element 21 produced by the extruder 22 commanded by the control unit 53 exits from the exit opening 25. At the start of the production, a head end 54 of the continuous elongated element 21 just exited from the abovementioned exit opening 25 is engaged between the first and the second pulley 32, 35, which are already in rotation, at the area of maximum proximity 48. The continuous elongated element 21 is advanced between the two branches 30a, 31a of the two conveyor belts 30, 31 up to the end 51. Given the proximity from the exit opening 25 to the area of maximum proximity 48, the head end 54 is only slightly bent downward, without however compromising the direct and correct insertion between the conveyor belts 30, 31. At the instant of insertion, due to the thickness of the continuous elongated element 21, the first support frame 34 together with the first conveyor belt 30 are slightly lifted upward on the abovementioned guides and such movement "ΔS" is detected by the movement sensor 44 which sends a signal "s" to the control unit 53. The control unit 53 controls the start of the rotation of the forming support 11, 16 on the basis of the received signal, when the continuous elongated element 21 is about to reach the end 51. In order to ensure that the continuous elongated element 21 advances together with the belts 30, 31 without sliding and without being excessively crushed, the actuator 41, possibly commanded by the control unit 53, compresses the first conveyor belt 30 against the continuous elongated element 21 (the action of the actuator 41 is summed with the weight of the first conveyor belt 30 and the first support frame 34) or it tends to lift the first conveyor belt 30 in a manner so as to partly unload the weight of the first conveyor belt 30 and the first support frame 34da from the continuous elongated element 21. Once it reaches the second roller 36, the head end 54 is laid on the forming surface 11a, 16a of the forming support 11, 16 already in rotation and is driven to below the roller 45 of the laying member 28 which presses it and fixes it against said forming surface 11a, 16a. The rotation of the forming support 11, 16 causes the winding of the continuous elongated element 21 continuously delivered from the extruder 22 on the forming support 11, 16 itself.

The control unit 53 is capable of adjusting the power of the rotary screw 24 and/or of the gear pump 26, of the motor 40 and of the devices 29 for moving the forming support 11, 16. In this manner, the control unit 53 controls and adjusts the exit speed "Ve" of the continuous elongated element 21 from the output opening 22b, the linear speed "Vt" of the conveyor belts 30, 31 and of the span of continuous elongated element 21 interposed between them and the peripheral speed "Vs" of the forming support 11, 16 and of the span of the continuous elongated element 21 adhering to the forming surface 11a, 16a.

The peripheral speed "Vs" of the forming support 11, 16 is maintained, both at the start and during operation, greater than the exit speed "Ve", in a manner so as to extrude the continuous elongated element 21 with a specific section (such to not lead to extrusion problems), stretch it and deposit it on the forming support 11, 16 with a desired design section (less than the extrusion section). By total stretch coefficient "$K_{tot}$" it is intended the ratio between the peripheral speed "Vs" and the exit speed "Ve". The stretching involves an elongation and a decrease of the section of the continuous elongated element 21. The total stretch coefficient "$K_{tot}$" is for example equal to about 1,4.

According to one embodiment, the linear speed "Vt" of the two branches 30a, 31a of the conveyor belts 30, 31 is greater than the exit speed "Ve" in a manner so as to subject the continuous elongated element 21 to two stretchings, one between the extruder 22 and the conveyor 27 and one between the conveyor 27 and the laying member 28.

By first stretch coefficient "$K_1$" it is intended the ratio between the linear speed "Vt" and the exit speed "Ve". By second stretch coefficient "$K_2$" it is intended the ratio between the peripheral speed "Vs" and the linear speed "Vt". The total stretch coefficient "$K_{tot}$" is equal to the product ($K_1*K_2$) of the first stretch coefficient "$K_1$" and the second stretch coefficient "$K_2$". The first stretch coefficient "$K_1$" is for example comprised between about 1 and about 1.5. The second stretch coefficient "$K_2$" is for example comprised between about 1 and about 3.

Figure 3A:
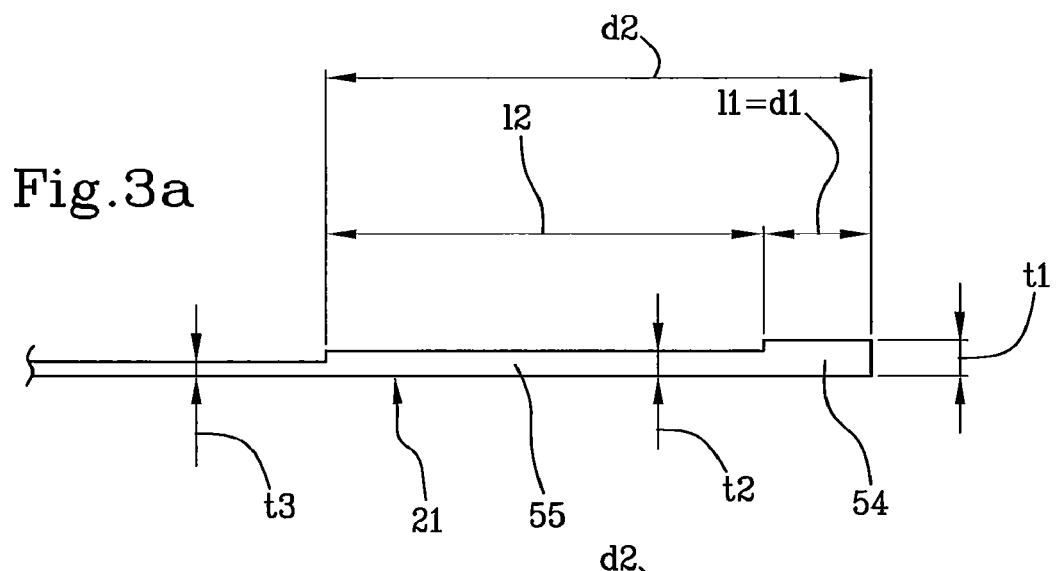
FIGS. 3a, 3b and 3c show respective continuous elongated elements obtained with the apparatus of FIG. 2.

According to one embodiment, the ratios between the exit speed "Ve", the linear speed "Vt" and the peripheral speed "Vs" are maintained constant during the entire work cycle. The head end 54 of the continuous elongated element 21 with length "l1" equal to the first distance "d1" (l1=d1) is not subjected to any stretching. A span 55 of the continuous elongated element 21 immediately adjacent to the head end 54 and with length "l2" equal to the difference between the second distance "d2" and the first distance "d1" (l2=d2−d1) is subjected to a single stretching with the first stretch coefficient "$K_1$" and the rest of the continuous elongated element 21 is subjected both to the first stretching and to a second stretching with the second stretch coefficient "$K_2$". The rest of the continuous elongated element 21 is subjected to a total stretching with the total stretch coefficient "$K_{tot}$" equal to the product of the first stretch coefficient "$K_1$" and the second stretch coefficient "$K_2$". It follows that, as illustrated in FIG. 3a, the head end 54 has a first thickness "t1" greater than a second thickness "t2" of the span 55 adjacent to the head end 54 which is in turn greater than a third thickness "t3" of the rest of the continuous elongated element 21. Analogously, the continuous elongated element 21 in the head end 54, in the span 55 adjacent to the head end 54 and in all of the remaining part thereof has different, progressively decreasing widths (not illustrated in the figures).

According to one embodiment, during an initial transient "Δt", measured starting from when the head end 54 is engaged between the conveyor belts 30, 31, the linear speed "V't" is greater than the operating linear speed "Vt". Said initial transient "Δt" is such that the continuous elongated element 21 travels the length "l2" of the span 55 of the continuous elongated element 21 immediately adjacent to the head end 54, i.e. it is equal to the ratio between the difference between the second distance "d2" and the first distance "d1" divided by the linear speed "V't" during the transient "Δt" (Δt=(d2−d1)/V't).

Figure 3B:
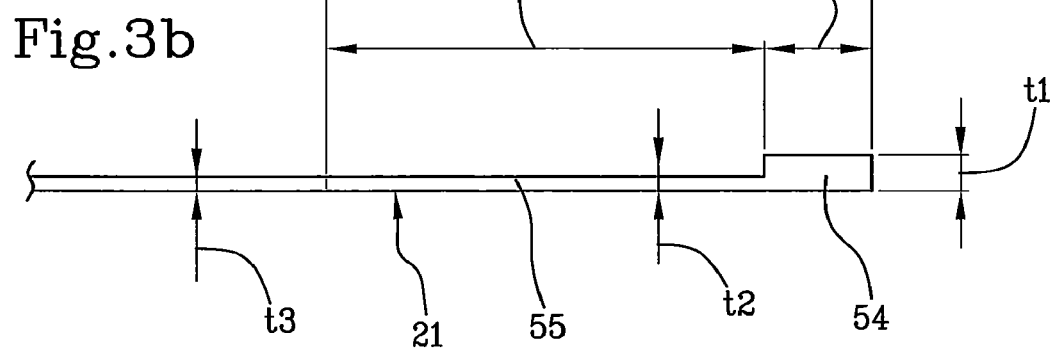

If the linear speed "V't" during the transient "Δt" is equal to the peripheral speed "Vs", said span 55 is stretched with a supplementary stretch coefficient "K'±" equal to the total stretch coefficient "$Kt0r$" and has a second thickness "t2" equal to the third thickness "t3" of the rest of the continuous elongated element 21 (FIG. 3b).

Figure 3C:
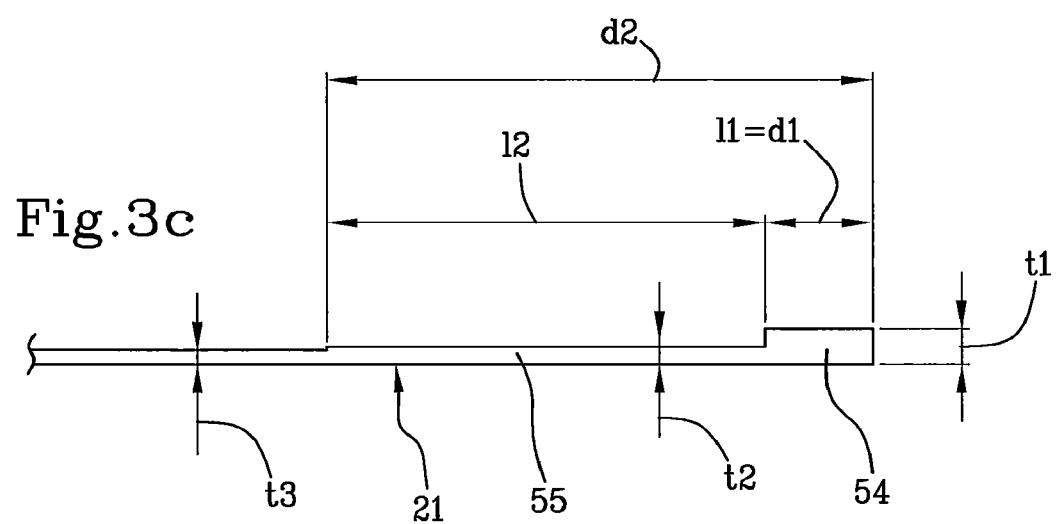

If the linear speed "V't" during the transient "Δt" is less than the peripheral speed "Vs" (but still greater than the operating linear speed "Vt"), said span 55 is stretched with a supplementary stretch coefficient "$K'_1$" less than the total stretch coefficient "$K_{tot}$" (but still greater than the first stretch coefficient "$K_1$") and has a second thickness "t2" greater than the third thickness "t3" (FIG. 3c) but less than the thickness that it would have if during the transient "Δt" the linear speed was the operating linear speed "Vt" (FIG. 3a).

Upon termination of the delivery, the control unit 53 stops the extruder 22, allowing the conveyor belts 30, 31 to revolve until the residue continuous elongated element 21 is removed. If, between one production cycle and the next, a small amount of elastomeric material exits from the opening 22b of the extruder 22 due to the pressure, this is deposited at the area of maximum proximity 48 and can be removed by moving the conveyor belts 30, 31.

What is claimed is:

1. An apparatus for building a tyre for vehicle wheels, comprising:
   a forming support;
   an extruder for dispensing a continuous elongated element made of elastomeric material;
   a conveyor arranged between the extruder and the forming support, wherein the conveyor comprises two opposite conveyor belts having respective conveyor branches arranged face to face and adapted to advance, in contact therewith, the continuous elongated element from the extruder toward the forming support, wherein an output opening of the extruder opens between mutually converging input portions of the respective conveyor branches of the two opposite conveyor belts;
   a first conveyor belt of the two opposite conveyor belts being mounted on a frame configured for movement by an actuator, wherein movement of the first conveyor belt toward and away from a second conveyor belt of the two opposite conveyor belts varies a mutual compression force between the two opposite conveyor belts during advancing of the continuous elongated element; and
   a movement sensor positioned in association with the first conveyor belt such that when introduction of a head end of the continuous elongated element between the two opposite conveyor belts causes the frame to move away from the second conveyor belt due to the presence of a thickness of the head end of the continuous elongated element between the two opposite conveyor belts, movement of the frame away from the second conveyor belt is sensed by the movement sensor, which generates a signal for starting rotation of the forming support on the basis of the signal when the continuous elongated element is about to reach a terminal end of one of the two opposite conveyor belts.

2. The apparatus according to claim 1, wherein the conveyor comprises two opposite pulleys, a respective one of the two opposite conveyor belts being partly wound on each of the pulleys, wherein the output opening is positioned at an area of maximum proximity between the pulleys.

3. The apparatus according to claim 2, wherein the output opening is arranged at a first distance less than about 10 mm from the area of maximum proximity.

4. The apparatus according to claim 3, wherein the first distance is between about 1 mm and about 5 mm.

5. The apparatus according to claim 3, wherein an end of the conveyor is arranged at a second distance less than about 100 mm from the forming support.

6. The apparatus according to claim 5, wherein the second distance is between about 10 mm and about 50 mm.

7. The apparatus according to claim 1, comprising a control unit operatively connected to the extruder, to the conveyor and to the forming support for adjusting ratios between an exit speed of the continuous elongated element from the opening, a linear speed of the two opposite conveyor belts and a peripheral speed of the forming support.

8. The apparatus according to claim 7, wherein the movement sensor is operatively connected to the control unit and configured to generate a signal indicative of a movement of one of the two opposite conveyor belts with respect to the other of the two opposite conveyor belts along a direction transverse to an advancement direction of the two conveyor branches.

9. The apparatus according to claim 8, wherein the movement sensor detects a vertical movement of an upper conveyor belt of the two opposite conveyor belts.

10. The apparatus according to claim 1, wherein the first conveyor belt is an upper conveyor belt of said two opposite conveyor belts.

* * * * *